United States Patent
Hoffmann

(10) Patent No.: US 7,362,746 B2
(45) Date of Patent: Apr. 22, 2008

(54) PROVISION OF IVR RESOURCES IN BICC NETWORKS

(75) Inventor: Klaus Hoffmann, München (DE)

(73) Assignee: Siemens Aktiengesellschaft, Munich (DE)

( * ) Notice: Subject to any disclaimer, the term of this patent is extended or adjusted under 35 U.S.C. 154(b) by 1117 days.

(21) Appl. No.: 10/290,465

(22) Filed: Nov. 8, 2002

(65) Prior Publication Data

US 2003/0118009 A1   Jun. 26, 2003

(30) Foreign Application Priority Data

Nov. 9, 2001   (EP) .................................. 01126801

(51) Int. Cl.
*H04L 12/66* (2006.01)
(52) U.S. Cl. ...................... 370/352; 370/385; 370/354; 379/88.17
(58) Field of Classification Search ................ 370/352, 370/395.2, 385, 386, 400, 401, 354; 379/88.17, 379/88.18
See application file for complete search history.

(56) References Cited

U.S. PATENT DOCUMENTS

| | | | | |
|---|---|---|---|---|
| 6,188,751 B1 * | 2/2001 | Scherer | .................... | 379/88.22 |
| 6,195,357 B1 * | 2/2001 | Polcyn | ....................... | 370/401 |
| 6,421,731 B1 * | 7/2002 | Ciotti et al. | ................. | 709/238 |
| 6,577,712 B2 * | 6/2003 | Larsson et al. | .......... | 379/88.17 |

FOREIGN PATENT DOCUMENTS

WO   IB-01/49011 A1   7/2001

OTHER PUBLICATIONS

R. Knight et al., "Bearer-Independent Call Control," BT Technol J., vol. 19, No. 2, Apr. 2001, pp. 77-88.
"Bearer Independent Call Control Protocol (CS2) Functional Description," Draft Recommendation Q.1902.1, Jul. 2001, pp. 1-28.
G. Ratta, "Bearer Independent Call Control and its Application of H.248 in Public Networks," ITU-T IP/MediaCom 2004 Workshop, Apr. 26, 2001, pp. GR10426-01-GR10426-16.
"Signalling System No. 7- Application Transport Mechanism: Bearer Independent Call Control (BICC)," ITU-T Recommendation Q 765.5, Jun. 2000, pp. i-iv, 1-22.

* cited by examiner

*Primary Examiner*—Melur Ramakrishnaiah
(74) *Attorney, Agent, or Firm*—Bell, Boyd & Lloyd LLP

(57) ABSTRACT

The invention relates to a method for providing IVR (interactive voice response) resources using the BICC protocol. In the method according to the invention, the provision of IVR resources is triggered in a CMN (call mediation node). The CMN brings about the execution of the BEARER REDIRECTION BICC procedure at an SN (service node) arranged upstream of it, and brings about access to IVR resources by means of the BICC procedure. The method according to the invention enables IVR resources in BICC networks to be provided directly at a CMN for the first time.

14 Claims, 4 Drawing Sheets

Vorher

Nachher

——— Bearer
·········· Call

PROVISION OF IVR RESOURCES IN BICC NETWORKS

CLAIM FOR PRIORITY

This application claims priority to European application 01126801.8 filed Nov. 9, 2001.

TECHNICAL FIELD OF THE INVENTION

The invention relates to a method for providing IVR (interactive voice response) resources using the BICC protocol.

BACKGROUND OF THE INVENTION

The implementation and improvement of telecommunications services with automatic voice output and voice transmission over a packet network is currently an important area of development in the field of switching technology.

Packet networks provide transmission capacities which are extensive in many ways and are already widely used for transmitting data. At present, increased efforts are being made to use the bandwidth made available by packet networks also for voice-based services. For example, work is being carried out on implementing the voice-based services over the Internet using the Internet Protocol (IP). In this context, the term voice over IP, abbreviated as VoIP, is often used.

The transmission of voice data over packet networks has the advantage of greater flexibility and a better use of the available transmission capacity than the conventional circuit-switched transmission of what are referred to as TDM (time division multiplexing) networks. Owing to the utilization of the capacity of the available packet networks, it is also assumed that the costs of voice-based services are lower than for circuit-switched transmission.

For the acceptance of voice-based services with data transmission over a packet network, it is important that the service features which are offered with voice transmission over a TDM network are also made available for transmission over a packet network.

For controlling voice connections with useful data transmission over a packet network, the BICC (bearer independent call control) protocol has been developed, and this protocol is described in the ITU-T standards Q.1901 and Q.1902.

Within the scope of data transmission using the BICC protocol, the useful data and the signaling information are frequently transmitted separately from one another. Within the scope of a link which is set up using the BICC protocol, the signaling information can be routed via a CMN (call mediation node). According to the ITU-T Q.1901, CMNs fulfill control functions without having direct access to the routing of the useful data, as is the case with SNs (service nodes). CMNs can optionally be used in BICC networks. A possible application of CMNs in the case of hierarchically structured switching is to control or direct the signaling information at higher switching levels from which there is no access to the useful data routing.

According to the standard (Q.1902.4, section 9.5.2 and Q.1901 section 10.2.2.4 a) and appendix III) it is not possible to create announcements or tones, i.e. IVR (interaction voice response) resources in a CMN. Reference is made only to the possibility of using a fault message (cause value) to bring about an interruption in the current state and to implement a link to IVR resources which are made available at another location—for example at an SN.

SUMMARY OF THE INVENTION

The invention discloses a method for providing IVR resources by means of a CMN.

In one embodiment according to the invention, the BEARER REDIRECTION BICC procedure (corresponding to Q.1902.6) is used in order to make available IVR (interactive voice response) resources at a CMN (call service node). Here, the CMN triggers the BEARER REDIRECTION BICC procedure at an SN (service node) which is arranged upstream of it. The BEARER REDIRECTION BICC procedure is used to establish a useful data link by means of which IVR resources are accessed.

The IVR functionality can be implemented directly in the CMN or provided by an IVR server which is controlled, for example, by the CMN. Alternatively, it is also possible to access IVR resources and an IVR server which are not controlled by this CMN but rather controlled by an SN (claim 3). In this case, the CMN has, for example, a table entry with an address information item relating to the SN. This address information item is communicated, during the connection set up—as described in Q.1902.6—within the scope of a connection set up message IAM (initial address message) by the CMN to the SN at which the IVR resources are provided.

In one embodiment of the invention, the signaling between the CMN and the IVR server can be carried out, for example, using the media gateway protocol or the H.248 protocol. The BEARER REDIRECTION BICC procedure is described in Q.1902.6. The CMN may not have the information as to whether the SN arranged upstream supports the BICC procedure. In one aspect of the invention, it is then appropriate for the CMN to check whether the SN arranged upstream supports the procedure, and to transmit a general fault message (cause value) to the SN arranged upstream, in accordance with the conventional method of Q.1902.6 when there is a negative result. With respect to the provision of IVR resources by the CMN it is appropriate to distinguish two cases. On the one hand, an existing useful data link can be changed by an event at the CMN in that one of the end points of the useful data link is applied to the IVR resources. The existing useful data link can then be released within the scope of the BEARER REDIRECTION procedure. The other case relates to a connection set up in which the address information of the end point of the useful data link is modified in the sense of a useful data link to the IVR server. Instead of a useful data link to the original destination, a useful data link is set up to the IVR server. Conventionally, when the address or the end point of the useful data link to be set up would have to be changed in a CMN, a fault message (cause value) would be communicated, for example, to a device arranged upstream, with access to the useful data routing. In accordance with the terminology of the standard Q.1902, a cause value, i.e. a fault message, would be transmitted as part of an REL (release message) to a CSF (call service function) arranged upstream. The method according to the invention permits a direct connection set up to an IVR server under the control of the CMN.

In another embodiment according to the invention, the invention provides IVR resources directly at a CMN. For example, if the CMN is used in a higher switching level and a correspondingly large number of links run via the CMN, the method according to the invention can be used to provide IVR resources at a relatively central point IVR. This has advantages, for example in terms of the capacity utilization of relatively costly IVR servers. Continuing to use the BEARER REDIRECTION procedure which is available within the scope of the BICC protocol avoids additional expenditure and the disadvantage of a lack of compatibility between proprietary or manufacturer-specific solutions.

Owing to the uniformity in terms of the methods used to provide IVR resources, the BEARER REDIRECTION procedure is also preferably used in the course of the provision of IVR resources in SNs which are arranged upstream or downstream of the CMN in order to access a resource server, or possibly the same resource server.

BRIEF DESCRIPTION OF THE DRAWINGS

The invention will be described in more detail below by means of two exemplary embodiments, in which.

DETAILED DESCRIPTION OF THE INVENTION

The BEARER REDIRECTION BICC procedure is described in the ITU-T document Q.1902.6. The embodiments of Q.1902.6 and the terminology used there are related below to the terminology used in the invention and to the exemplary embodiments. A central device element of BICC networks is the node which is abbreviated as SN (service node). Service node is a general expression for functional device elements which are required by services (see for example Q.1902.4). Further, terms which are referred to in the standard are CALL and BEARER. Within the scope of this application for an invention, CALL is rendered by signaling information or stream of signaling information, and BEARER by useful data link. These are not translations of the English terms which are to be understood from the context of the ITU terminology, and therefore cannot be translated one to one into German, but rather a description which is selected in the invention in order to clarify the function of the BEARER REDIRECTION procedure. In this sense, BEARER REDIRECTION is rendered as "redirection of the useful data stream".

Figure 1:
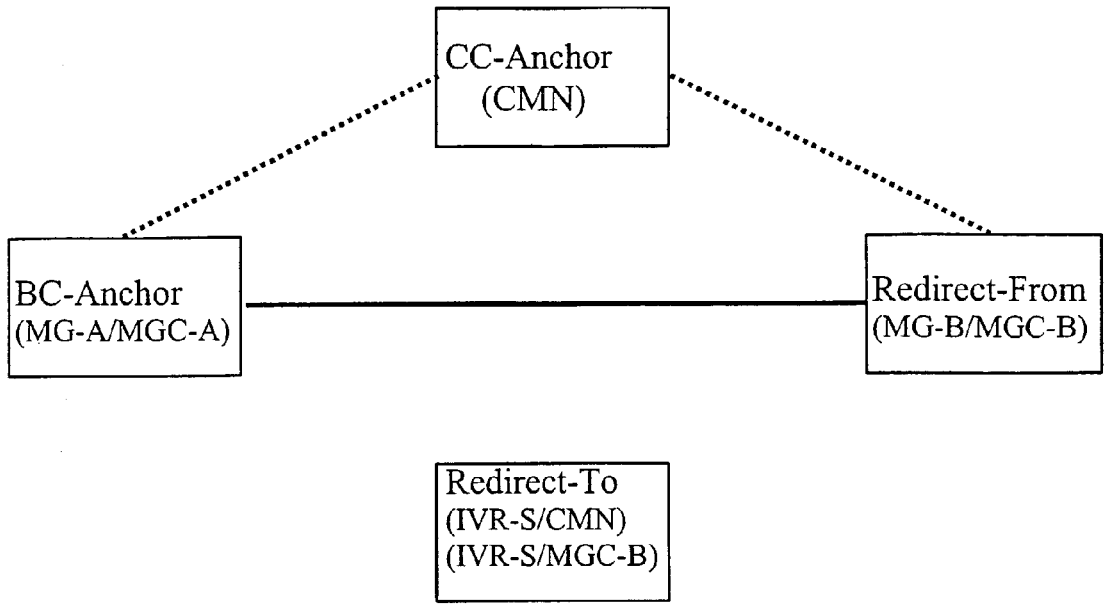
FIG. 1 shows a function of the BEARER REDIRECTION procedure.
Figure 1:
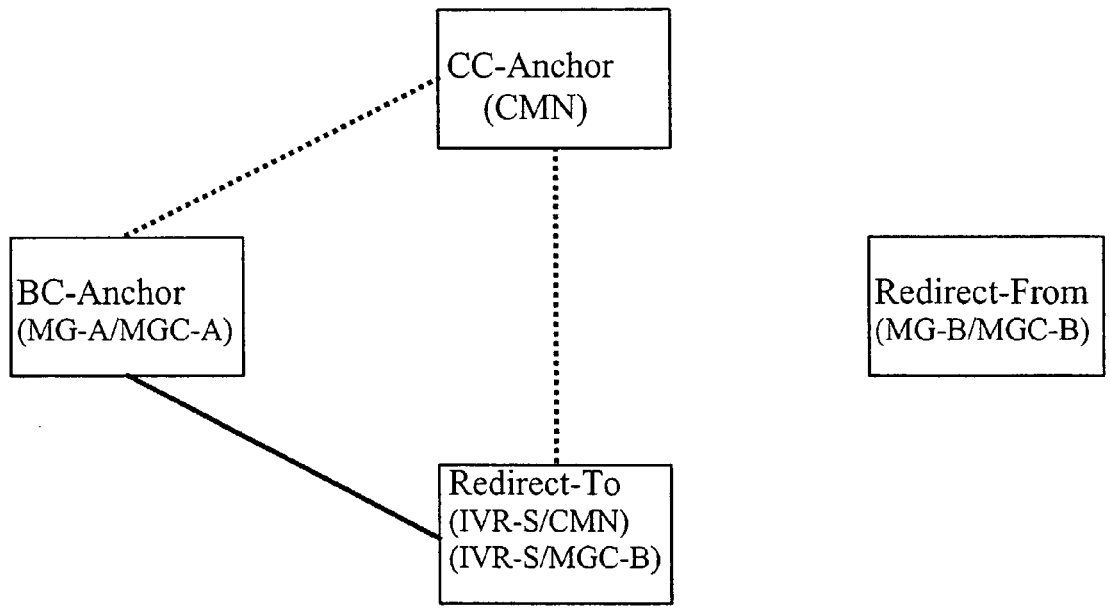

FIG. 1 illustrates four different nodes: CC-Anchor: an SN or CMN via which the signaling information is routed and at which the redirection of the useful data stream is triggered. CC stands for "Call Control".

BC-Anchor: an SN with functions for controlling the useful data stream. It corresponds to the node in the path of the useful data at which the redirection of the useful data stream is carried out.

Redirect-from: an SN at which the signaling information and the useful data link originally terminate.

Redirect-to: an SN at which the signaling information and the useful data link terminate after the redirection of the useful data stream.

Figure 2:
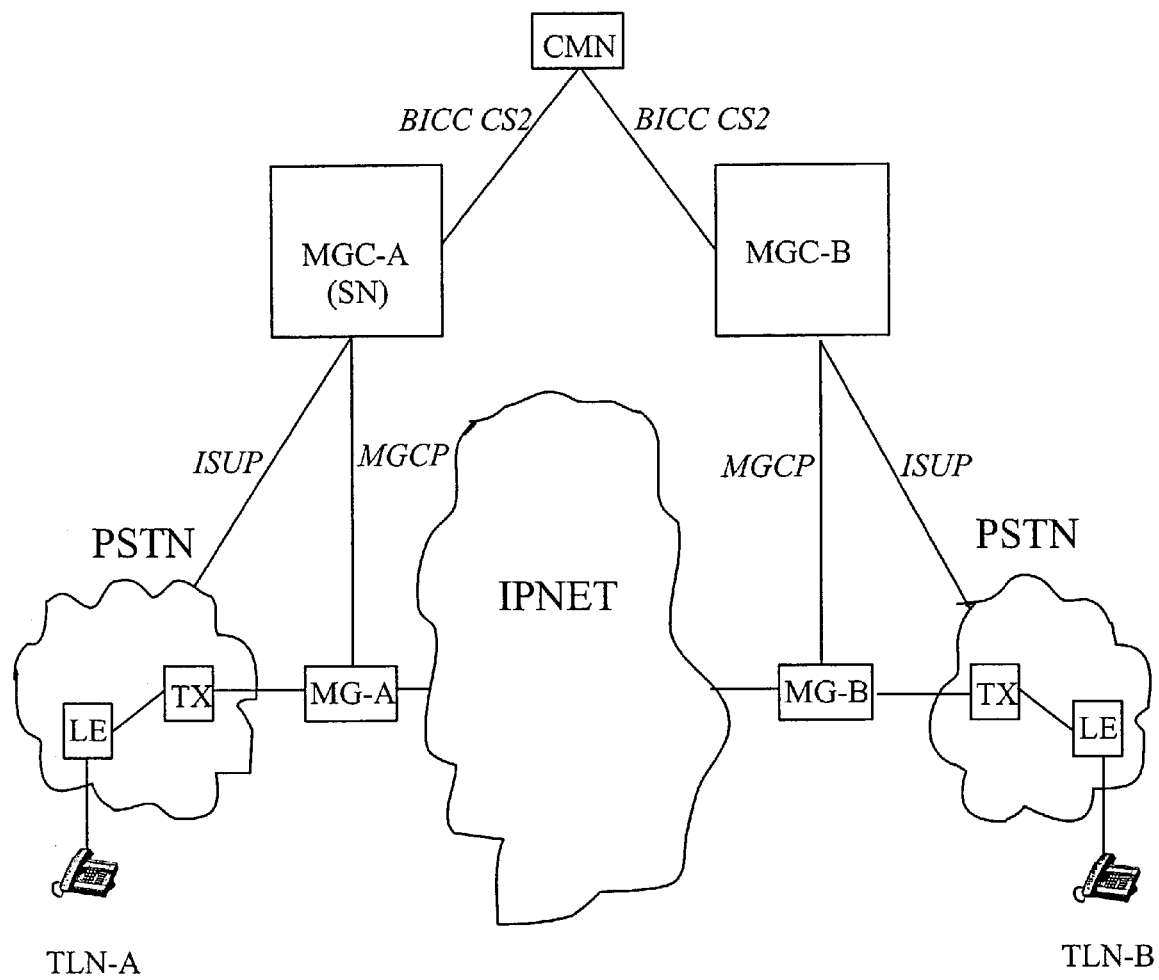
FIG. 2 shows a system with a CMN for a link with separate transmission of useful data and signaling information.

FIG. 2 shows a system with a CMN. Two different examples are illustrated in which IVR resources are provided either at the CMN (FIG. 3) or at an SN arranged downstream (FIG. 4).

The designations used in Q.1902.4 and the designations of the first exemplary embodiment (FIG. 3) interrelate as follows:

CC-Anchor: comprises functions of the CMN from FIG. 2.

BC-Anchor: comprises functions of the A-end network access device MG-A and control device MGC-A.

Redirect-from: comprises functions of the B-end network access device MG-B for the useful data and the associated control device MGC-B for the signaling information.

Figure 3:
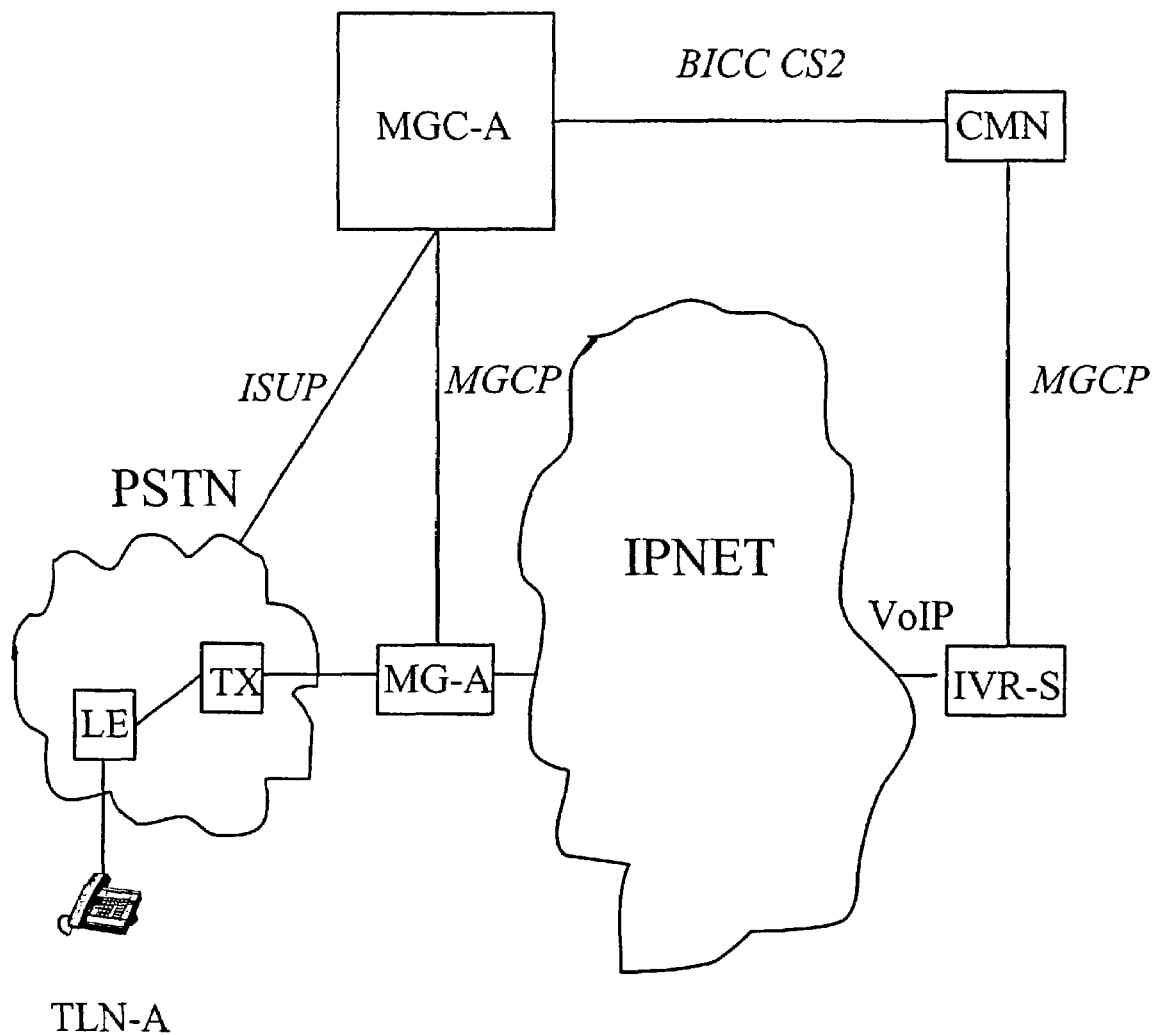
FIG. 3 shows the provision of IVR resources at the CMN for a system corresponding to FIG. 2.
Figure 4:
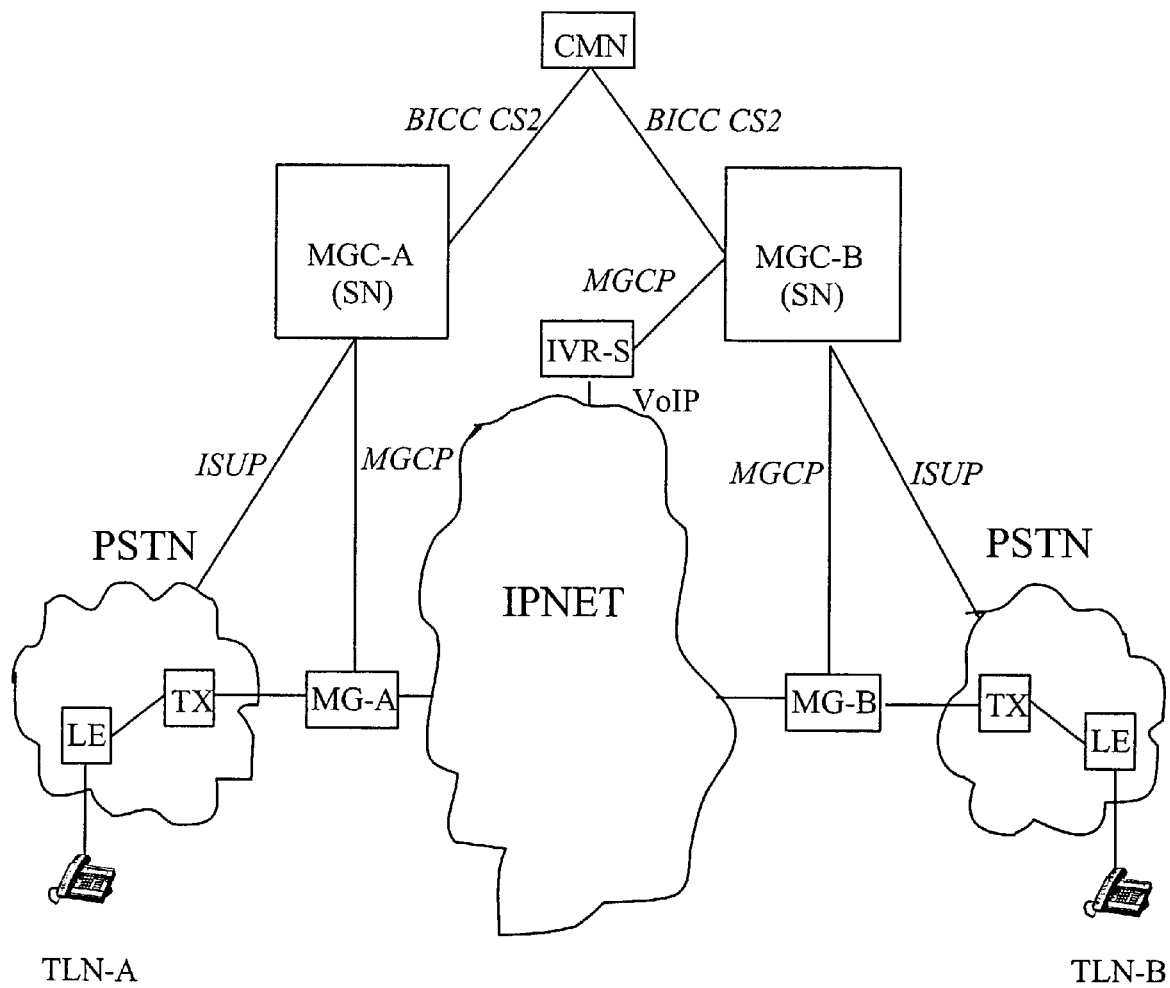
FIG. 4 shows the provision of IVR resources for a system corresponding to FIG. 2, at an SN arranged downstream of the CMN.

Redirect-to: comprises functions of the CMN and of the IVR server IVR-S from FIG. 3.

The corresponding designations of the first exemplary embodiment (FIG. 3 and FIG. 2 for the Redirect-From node) are given in brackets.

The second exemplary embodiment (FIG. 4) differs from the first in terms of Redirect-To. The relationship is then:

Redirect-To: comprises functions of the IVR server IVR-S from FIG. 4 and of the control device MGC-B.

This different assignment of Redirect-To is given in FIG. 1 in brackets under the assignment of the first exemplary embodiment.

FIG. 1 shows the most general case. The exemplary embodiment illustrated in FIG. 3 cannot be transferred directly to the most general case because the functions of the nodes CC-Anchor and Redirect-To in the exemplary embodiment are not completely separated. The assignment of the elements from FIG. 1 to the elements of the first exemplary embodiment is discussed below. In the first exemplary embodiment, the nodes CC-Anchor and Redirect-To are combined and their functions are considered as being implemented by the CMN and the IVR server IVR-S. Signaling between the CMN and the IVR server IVR-S by means of the media gateway protocol MGCP or H.248 is then to be considered as node-internal signaling, which is not reflected in FIG. 1 in which the signaling represented (Call) is performed using the BICC protocol. The other nodes corresponding to the representation of Q.1902.6 or FIG. 1 combine, to a certain extent, signaling and routing functions of the useful data stream. In contrast, FIG. 2 shows different physical nodes for controlling the stream of signaling information (for example MGC-A, MGC-B) and of the useful data screen (MG-A, MG-B). A constellation corresponding to FIG. 1 is attained if the functions of MGC-A and MG-A as well as MGC-B and MG-B are implemented in one physical node in each case. This difference in the implementation has no effect on the basic sequencing of the BEARER REDIRECTION procedure.

On the other hand, in the second exemplary embodiment the nodes CC-Anchor and Redirect-To are implemented separately by the CMN on the one hand and the IVR server IVR-S and the control device MGC-B on the other.

The redirection procedure is represented in detail in section 6.5 of Q.1902.6. The points which are essential for comprehension of the invention are discussed below within the scope of the exemplary embodiment according to the invention. Here, the procedure for redirecting the useful data stream with triggering of the useful data link between the BC-Anchor and Redirect-From is described. The triggering can also be omitted within the scope of the BEARER REDIRECTION procedure.

According to FIG. 1 above, there is originally one useful data link from BC-Anchor to Redirect-From. The signaling runs via CC-Anchor. At the CC-Anchor, the redirection of the useful data stream (BEARER) is triggered. An APM (application transport mechanism) message, which comprises the indicator "Bearer Redirect" which indicates the start of the procedure, and the indicator "Redirect Forward Request" which specifies the procedure to be started, is sent by the CC-Anchor to the SN ("preceding node") arranged upstream. Depending on the situation, the indicator "Redirect Backwards Request" can be used instead of the indicator "Redirect Forwards Request". The SN which is arranged upstream, i.e. the BC-Anchor in FIG. 1, responds with an APM message with the indicator "Connect Forward" or "Connect Backward" as well as further information relating to the set up of a useful data link.

At the same time, the triggering of the original useful data link by the CC-Anchor can be initiated by transmitting an APM message to the SN arranged upstream, the APM message specifying the action indicator "Bearer Redirect" and the indicator "Redirect Bearer Release Request" which specifies the triggering of the useful data link as an action. The SN arranged upstream responds with an APM message with the action indicator "Bearer Redirect" and the indicator "redirect bearer release proceed". When this APM message is received, the CC-Anchor transmits the message REL (release message) to the Redirect-From and in doing so releases the useful data link. Redirect-From responds by transmitting the message RLC (release message complete) to the CC-Anchor. The CC-Anchor then transmits an APM message with action indicator "Bearer Redirect" and the indicator "redirect bearer release complete" to the SN which is arranged upstream.

FIG. 1 illustrates the situation before ("before") and after ("after") the redirection. The originally existing useful data link between the BC-Anchor and Redirect-From is released and is replaced below by the useful data link BC-Anchor to Redirect-To. The signaling information then runs via CC-Anchor to Redirect-To instead of to Redirect-From.

An alternative when releasing the existing useful data link is the "break before make" procedure which releases the existing useful data link immediately.

FIG. 2 illustrates a system for a telephone call which is directed via a packet network IPNET, for example a network which is based on the Internet Protocol. The terminals TLN-A and TLN-B which are involved are both connected to a PSTN network (public switched telephone network). For the PSTN networks, the time-division multiplex technique—also abbreviated as TDM (time division multiplexing)—is usually used to combine data from various terminals and channels and transmit them via high-capacitance connecting lines frequently referred to as a trunk. For the exemplary embodiment it is assumed that the terminal TLN-A is the calling terminal, and the terminal TLN-B is the called terminal. Useful data and control information are routed separately during the telephone call, as provided in the SS#7 signaling system. The useful data is transmitted by the terminal TLN-A to a local exchange LE near to the subscriber, and from said local exchange LE to a transit exchange TX. The transit exchange TX is connected to a network access element MG-A (MG standing for Media Gateway) which is provided for processing TDM useful data for transmission over a packet network IPNET. Useful data which are transmitted over the packet network IPNET within the scope of a voice application are processed again at the receiver end by a network access element MG-B in order to be then transmitted via a PSTN network, firstly to a transit exchange TX and finally to a local exchange LE which is near to the subscriber, and to the subscriber terminal TLN-B. Signaling data for setting up a connection is, on the one hand, transmitted to the control unit MGC-A (MGC standing for Media Gateway Controller) to which the A-end network access unit MG-A is assigned. In order to monitor and control the useful data stream, the control unit MGC-A communicates with the A-end network access unit MG-A. For example, within the scope of the link set up, signaling information is transmitted by the A-end network access unit MGC-A to the B-end control unit MGC-B via a CMN.

The reference symbols of the protocols which are used to exchange signaling information are highlighted in the figure by means of italics. Signaling information which is transmitted to the control units MGC-A and MGC-B via the PSTN networks is transmitted using the ISUP (ISDN user part) protocol. In order to exchange information between the control units MGC-A and MGC-B and the network access devices MG, a media gateway control protocol MGCP which may be adapted on a manufacturer-specific basis is used. Alternatively, the communication between the control units MGC-A and MGC-B and the network access devices MG can also be carried out using the H.248 protocol. The signaling between the two control units MGC-A and MGC-B is carried out using the BICC CS2 or using a correspondingly adapted version of the ISUP (ISDN user part) protocol.

It is explained below by reference to FIG. 3 how a connection is generated between the terminal TLN-A and the IVR server IVR-S from an existing link between the terminals TLN-A and TLN-B by means according to the invention. This event is brought about by the CMN. In this process, the CMN controls the IVR server IVR-S using a suitable protocol, for example the Media Gateway Protocol MGCP or the H.248 protocol. In the control device MGC-A which is arranged upstream, the CMN uses the BEARER REDIRECTION CAPABILITY information element to check whether the control device MGC-A supports the BEARER REDIRECTION procedure. If the procedure is supported, the control device MGC-A which is arranged upstream is requested, using an APM message BEARER REDIRECT REQUEST/FORWARD, to set up a further connection. The control device MGC-A which is arranged upstream then responds with an APM CONNECT FORWARD and with further information relating to the connection set up. When the APM CONNECT FORWARD is received, the CMN exchanges signaling information with the IVR server IVR-S within the scope of the connection set up. The address information which is necessary for setting up the useful data link and which relates to the IVR server IVR-S is transmitted by the CMN to the control device MGC-A which is arranged upstream and passed on from there to the network access device MG-A using the MGCP protocol. A useful data link, for example a VoIP (Voice over IP) link, is established between the network access device MG-A and the IVR server IVR-S using the address information.

At the same time as the initiation of the set up of a useful data link to the IVR server IVR-S, the CMN can trigger the release of the link illustrated in FIG. 2 between the terminals TLN-A and TLN-B or the useful data link between the network access devices MG-A and MG-B. For this purpose, the CMN transmits the APM BEARER REDIRECT/REDIRECT RELEASE REQUEST to the control device MGC-A arranged upstream. The control device MGC-A which is arranged upstream responds to the CMN with the APM message REDIRECT BEARER RELEASE PROCEED. If the CMN receives the APM message with BEARER REDIRECT/REDIRECT RELEASE PROCEED, the CMN releases the link to the MGC-B or MG-B with REL (release message). The MGC-B then responds with RLC (release message complete). The CMN then transmits an APM message BEARER REDIRECT/REDIRECT RELEASE COMPLETE back to the control device MGC-A.

As an alternative to providing IVR resources at the CMN, the CMN can also permit access to IVR resources which are monitored or controlled by an SN. This is illustrated in FIG. 4. The IVR server IVR-S is then controlled by the control device MGC-B which provides functions of an SN. For reasons of economical representation, in the second exemplary embodiment the IVR server IVR-S is controlled by the same control device as the network access device MG-B which functions as a Redirect-From for the useful data link. According to the invention, this is independent. The IVR server IVR-S can equally well form the Redirect-To node using a control device or SN which is different from MGC-B.

According to FIG. 4, the invention runs in partially in the same way as the method according to FIG. 3. Therefore, only a discussion of the differences will be covered below. When there is an event at the CMN which triggers the provision of IVR resources, the CMN checks whether IVR resources are also available. The CMN has, for example, an entry with an address information item which indicates the availability of IVR resources at the control device MGC-B. As above, the CMN triggers the BEARER REDIRECTION BICC procedure in the BC-Anchor or the control device MGC-A. The control device MGC-A transmits a message to the CMN for the setting up of a new useful data link. This is an APM message with the indicator "Connect Forward" or "Connect Backward" as well as further information for setting up a useful data link. In the CMN, a connection set up message IAM (initial address message) with an APP (application transport parameter) is generated using the received message and stored information, for example the entry for localizing the IVR resources, and transmitted to the control device MGC-B or the Redirect-To node. The connection set up are described in detail in Q.1902.6. In principle, the connection set up message is then acknowledged in the opposite direction from the control device MGC-B to the control device MGC-A via the CMN, and information for the setting up of the useful data link, for example the address of the IVR server IVR-S, is transmitted. The control device MGC-A then terminates the setting up of the useful data link between the network access device MG-A and the IVR server IVR-S using the media gateway protocol MGCP, and transfers the information which is necessary for this.

What is claimed is:

1. A method for providing interactive voice response resources using a BICC protocol, comprising:
    transmitting data and signaling information separately;
    triggering the provision of interactive voice response resources in a call mediation node;
    executing the call mediation node of the BEARER REDIRECTION BICC procedure when there is a service node arranged upstream thereof, and
    establishing a data link for an access to interactive voice response resources using the BEARER REDIRECTION BICC procedure.

2. The method as claimed in claim 1, wherein
    the interactive voice response resources are provided in an interactive voice response server or a server with interactive voice response functionality.

3. The method as claimed in claim 2, wherein
    the interactive voice response server or the server with interactive voice response functionality is controlled by the call mediation node or an service node.

4. The method as claimed in claim 3, wherein
    the interactive voice response server or the server with interactive voice response functionality is controlled by an service node, and
    for access to the interactive voice response resources, the call mediation node has an input which is used to localize the interactive voice response resources.

5. The method as claimed in claim 4, wherein
    a link set up message initial address message is generated by the call mediation node output with aid of an entry transmitted to the service node.

6. The method as claimed in claim 2, wherein
    the media gateway protocol or the H.248 or Q.1950 is used for signaling between the call mediation node or service node and the interactive voice response server or the server with interactive voice response functionality.

7. The method as claimed in claim 1, wherein
    a data link exists before execution of the method, and
    the data link is released within the framework of the BEARER REDIRECTION BICC procedure.

8. The method as claimed in claim 2, wherein
    an interrogation is carried out in the call mediation node to determine whether a data link exists,
    in the case of an existing data link the BEARER REDIRECTION procedure is carried out, and
    in the case of a data link which is being set up, the link set up is changed to bring about a data link to the interactive voice response server.

9. The method as claimed in claim 1, wherein
    the call mediation node checks whether the service node which is arranged upstream supports the BEARER REDIRECTION procedure.

10. The method as claimed in claim 9, wherein
    if the service node arranged upstream does not support the BEARER REDIRECTION procedure, the call mediation node transmits a fault message to the service node arranged upstream.

11. The method as claimed in claim 1, wherein
    the provision of interactive voice response resources is triggered in an service node which is arranged upstream or downstream of the call mediation node, and
    when interactive voice response resources are provided triggered in the service node which is arranged upstream or downstream, the interactive voice response resources are provided using the BEARER REDIRECTION BICC procedure.

12. The method as claimed in claim 1, wherein
    the data are transmitted via a packet network,
    when there is an service node arranged upstream, the call mediation node requests the execution of the BEARER REDIRECTION procedure, and
    the service node sets up the data stream to an interactive voice response server at a network access device which is controlled thereby.

13. The method as claimed in claim 12, wherein the data are transmitted via an IP network or an ATM network.

14. The method as claimed in claim 1, wherein the interactive voice response resources are made available for a voice over IP link.

* * * * *